Dec. 1, 1959 D. S. GREY 2,914,997
COMBINED RANGE AND VIEW FINDER FOR CAMERAS
Filed Oct. 3, 1956 4 Sheets-Sheet 1

INVENTOR.
David S. Grey
BY
Brown and Mikulka
and
Robert E. Corb
ATTORNEYS

Dec. 1, 1959  D. S. GREY  2,914,997
COMBINED RANGE AND VIEW FINDER FOR CAMERAS
Filed Oct. 3, 1956  4 Sheets-Sheet 2
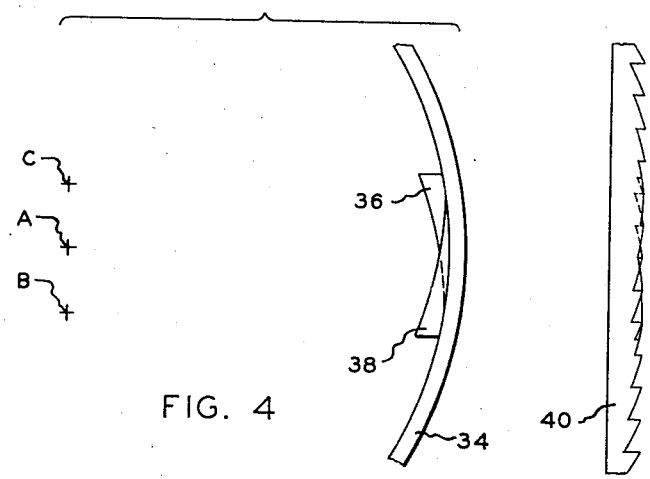
FIG. 4
FIG. 6
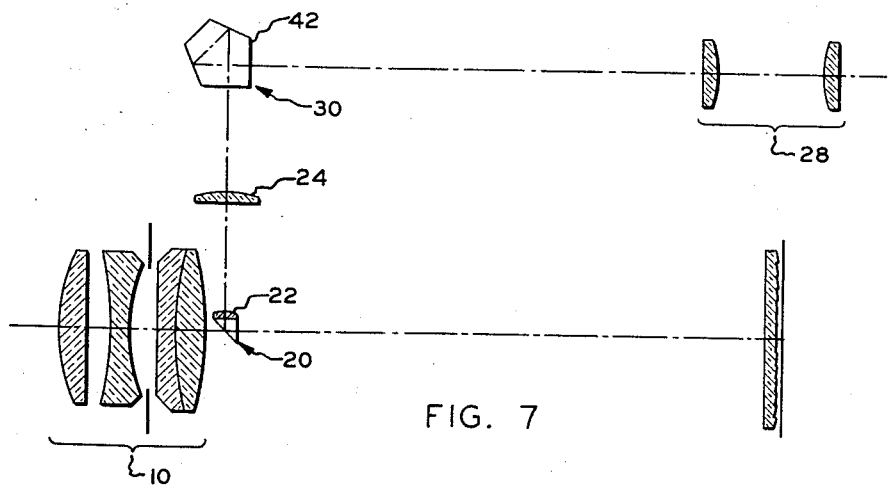
FIG. 7
FIG. 5
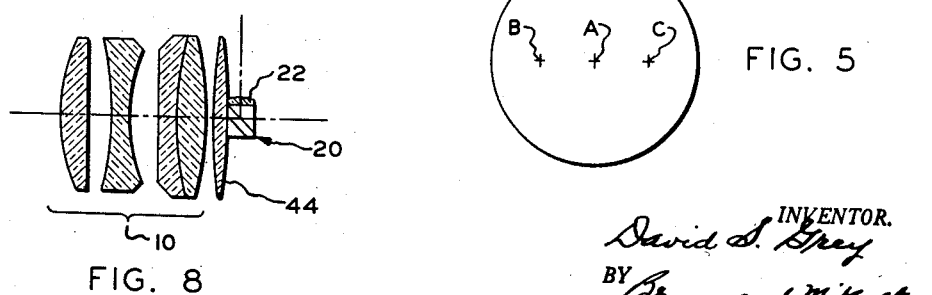
FIG. 8
INVENTOR.
David S. Grey
BY
Broward Mikulka
and
Robert E. Corb
ATTORNEYS Dec. 1, 1959 D. S. GREY 2,914,997
COMBINED RANGE AND VIEW FINDER FOR CAMERAS
Filed Oct. 3, 1956 4 Sheets-Sheet 3

INVENTOR.
David S. Grey
BY Brown and Mikulka
and
Robert E. Corb
ATTORNEYS

Dec. 1, 1959  D. S. GREY  2,914,997
COMBINED RANGE AND VIEW FINDER FOR CAMERAS
Filed Oct. 3, 1956  4 Sheets-Sheet 4

INVENTOR.
David S. Grey
BY Brown and Mikulka
and
Robert E. Corb
ATTORNEYS

United States Patent Office 2,914,997
Patented Dec. 1, 1959

2,914,997

COMBINED RANGE AND VIEW FINDER FOR CAMERAS

David S. Grey, Weston, Mass., assignor to Polaroid Corporation, Cambridge, Mass., a corporation of Delaware Application October 3, 1956, Serial No. 613,769

17 Claims. (Cl. 95—42)

This invention relates to a combined split field range finder and view finder system for a camera employing the camera objective as the primary image-forming objective for both ranging and viewing.

Combined range finder and view finder systems have been proposed wherein a major image-forming objective is employed for both forming the general field image of a viewing field and for directing marginal rays through an optical system comprising the split field range finder. Such systems, when incorporated in a camera, may employ the objective lens of the camera or an auxiliary objective and may be of the type wherein the observer's line of sight is perpendicular to the objective axis, or the eye level type wherein the observer's line of sight is generally parallel with the axis of the camera objective. Eye level combination view and split field range finders using the camera objectives have been incorporated into cameras of the so-called miniature type, such as cameras for taking 35 mm. pictures. Systems of this type proposed heretofore and suitable for miniature type cameras, while being highly desirable, are unsuited for incorporation into larger cameras such as cameras having an image diagonal exceeding about three inches. This is largely due to the fact that combination range and view finder designs proposed heretofore would be unduly cumbersome, expensive and bulky if they were incorporated into a large camera.

Objects of the present invention are: to provide, in a camera, a novel combination eye level, split field range finder and view finder system using the camera objective which is relatively simple and compact in construction and suitable for incorporation into larger type cameras; to provide a combination range and view finder as described for use in a camera wherein focusing of the camera objective is achieved by varying the distance between the objective and focal or film plane of the camera; to provide a combination range and view finder as described for use in a camera of the so-called folding type wherein the objective lens is displaceable toward and away from the film plane located in the rear section of the camera and a light path is provided between the objective and film plane by extensible means such as a folding bellows; and to provide a combination range and view finder system of the above type which may be employed with different camera lenses within a predetermined range of focal lengths whereby the camera incorporating the system may be used, for example, with interchangeable standard and telephoto lenses with the same range and view finder system.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 4 is an exaggerated view diagrammatically illustrating one form of optical element useful in the system of Fig. 1;

Fig. 5 is a view showing the location of certain reference points relating to the construction of the element of Fig. 4;

Fig. 6 is a view similar to Fig. 4 illustrating another form of optical element;

Figs. 7 and 8 are views similar to Fig. 1 of other forms of optical systems constructed in accordance with the present invention;

In general, combined view finder and split field range finder systems of the type with which the present invention is concerned are considered particularly desirable since they offer a number of advantages over other types of systems. These include a view finder utilizing the camera objective so that the field of view appears erect and with correct relative positions for right and left and exactly as the camera objective will image it, and requires no correction for parallax. The ranging field is of the split field type and ranging thereby is more accurate than ordinary superposition ranging since it relies on the vernier acuity of the eye rather than on the resolving power of the eye. Both the ranging and viewing fields appear bright and with little light loss so that the system may be employed with ease under adverse lighting conditions.

The combined view finder and split field range finder optical system of the invention offers a number of added advantages over proposed systems principally in that it is adapted for incorporation in larger type cameras, whereas proposed systems have been suited for use only in small or miniature cameras. The present system is of the so-called "eye level" type, can be compactly folded, and permits the use of different lenses with the camera without necessitating changes in the range finder and view finder system.

Figure 1:
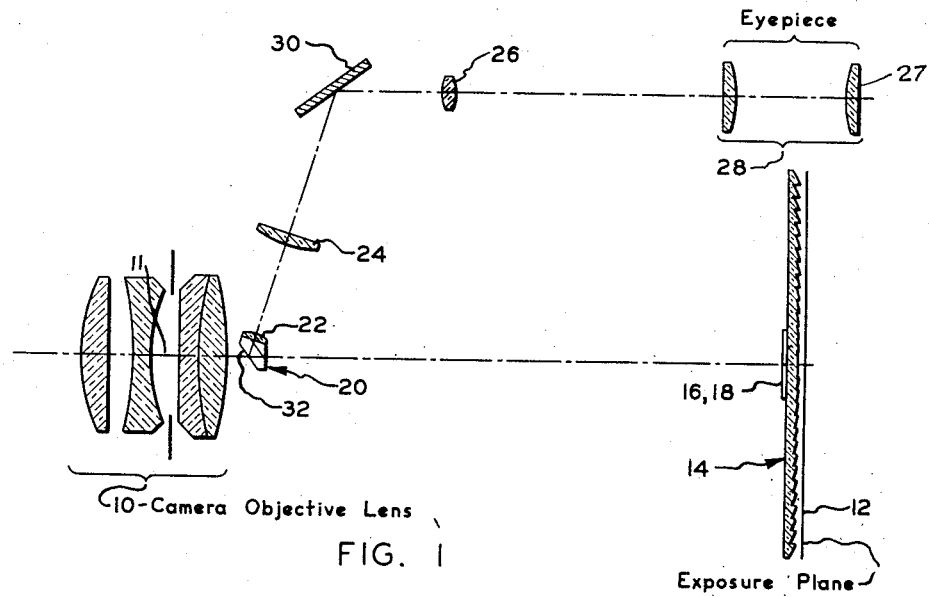
Figure 1 is a side elevational view, in section, illustrating diagrammatically a combined range and view finder optical system constructed in accordance with the present invention.
Figure 2:
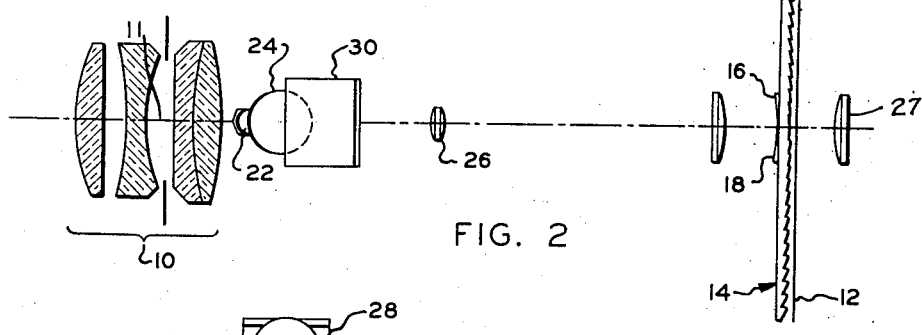
Fig. 2 is a plan view, in section, of the optical system of Fig. 1.
Figure 3:
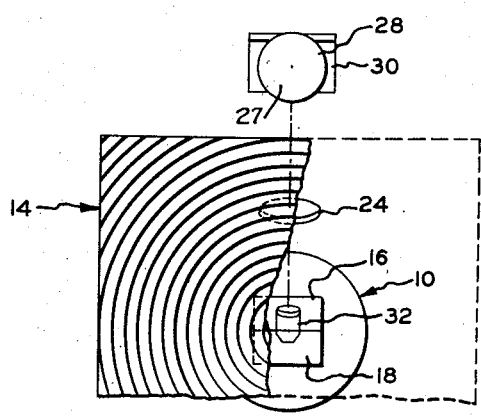
Fig. 3 is a rear elevational view, with parts broken away, of the system of Fig. 1.

Reference is now made to Figs. 1 through 3 of the drawings wherein there is illustrated one form of combined split field range finder and view finder optical system embodying the present invention. The optical system comprises a conventional photographic objective lens 10 and means, such as a telescope or low power microscope having an entrance pupil 27, for viewing the focal plane of objective 10 from the side of the lens. Objective lens 10 is mounted for movement axially relative to a focal or exposure plane 12 for focusing the objective relative to said plane, the mean axial position at which said movement of lens 10 is arrested and focus attained being arbitrarily designated at 11. A concave reflector is provided substantially at exposure plane 12 for reflecting light from the objective to the entrance pupil of the viewing system. When in focus, the objective forms an image of the field of view including an object to be ranged in a primary image plane located at exposure plane 12. Photosensitive material is normally located at plane 12 for exposure to light from lens 10.

In the form shown in Figs. 1 through 3, the concave reflector comprises a spherical rear surface echelon mirror 14 (an echelon mirror being a compound, spherically reflecting mirror having a plurality of concentric annular mirrors so disposed around a common center that all have a common focus) having a center of curvature located preferably on the optical axis of objective 10 at substantially the mean axial position 11 of lens 10. Mirror 14 is a rear surface mirror so that it may be positioned at or very close to the exposure plane of the camera, while the photosensitive material, normally located at the exposure plane, need be displaced rearwardly only slightly or not at all. Mirror 14 may be provided with a forward reflecting surface instead of a rear reflecting surface, in which case it may be necessary to displace the photosensitive material rearwardly from the exposure plane in order to locate the reflecting surface of the mirror substantially at the exposure plane. When the camera objective is being employed for ranging and/or viewing, means must be provided for preventing exposure of the photosensitive material located at plane 12 and it is in this respect that mirror 14 serves a dual function. Mirror 14 is substantially coextensive in size and shape with the exposure plane so that it completely obscures said plane for preventing light from reaching the photosensitive material. Accordingly, while the curvature of mirror 14 is spherical, the shape of the mirror is preferably rectangular since the exposure plane of most conventional cameras is rectangular and as a rule is defined by a rectangular aperture in a wall of the camera with the photosensitive material being supported in the exposure plane by portions of the wall bordering the aperture.

Means are provided on the medial portion of the forward surface of mirror 14 for horizontally deviating, in opposite directions, light from the object to be ranged, reflected from the mirror. The light-deviating means may comprise, as shown, a pair of relatively small optical wedges 16 and 18 disposed in adjacent relationship on opposite sides of the optical axis of the objective with one located above, and the other located below, said axis. The wedges are inverted relative to one another so that their bases lie on opposite sides (to the left and right) of the optical axis and their line of intersection extends at least approximately horizontally through the optical axis. The image of the object to be ranged is formed, by the wedges, as two adjacent portions. The wedges or other light-deviating means, when located at the plane of an image, do not displace the image portions but, when moved away from the plane of the image, will displace the image portions in opposite directions relative to one another and parallel to the line of intersection of the wedges. Thus the object being ranged will appear to be split along a line corresponding to the line of intersection of the two wedges and the two portions of the image of said object will appear displaced from one another until the camera objective is in focus, at which time the two portions of the image of the object will appear in coincidence at the line of intersection.

The terms "horizontal" and "vertical" are used herein for descriptive purposes only and as a convenience for describing the relative positions of the components of the ranging and viewing system and the direction of displacement of two images in opposite directions in the same plane looking at the field of view through the finder, and not in a limiting sense. The wedges, instead of being positioned to the left and right of the axis for deviating light horizontally, may be positioned above and below the axis for deviating the light in opposite directions vertically as would be the case if the system were rotated through 90 degrees.

The optical system for viewing the exposure plane or focal plane of lens 10 comprises a second reflecting means, designated 20, located on the optical axis of the objective preferably as close to the objective as possible commensurate with size and spatial limitations thereof for reflecting light incident from mirror 14 upward at an angle of 90° or less. In regard to the positioning of means 20, it must be remembered that the camera and viewing system are intended for use with a number of interchangeable objective lenses each of which may be movable as a unit for focusing and whose rearwardmost components may be located at different positions relative to the exposure plane of the camera, so that reflecting means 20 must be so positioned that it does not interfere with any of the lenses intended for use with the camera. Reflecting means 20 is dimensioned so that it obscures only a relatively small medial portion of lens 10 and blocks only the light from the center of the lens which is not used for either viewing or ranging.

The viewing system includes an objective lens 22, field lens 24, relay lens 26 and an eyepiece 28. The combined view and range finder is preferably of the so-called "eye level" type so that at least the eyepiece is mounted with its optical axis substantially parallel with the optical axis of lens 10. A third reflecting element 30 is provided preferably between the field lens 24 and relay lens 26 for redirecting light reflected from means 20 through eyepiece 28. The location of reflecting means 20 on the optical axis of objective 10 eliminates aberrations, and the necessity for correcting them, that would be introduced into the system if reflecting means 20 were located adjacent to and to one side of the lens.

A combined range and view finder system of the invention includes at least three reflecting elements in the optical path between lens 10 and eyepiece 28 and accordingly must include means for producing the image reversals necessary to form an image which is erect with correct relative positions for left and right. In one form this means comprises a roof or Amici prism 32 which may be located at either of two positions so that it comprises either reflecting means 20 or reflecting element 30. It is preferred that roof prism 32 comprise reflecting means 20 so that its size can be smaller than that required if it were to comprise reflecting element 30. Objective lens 22 of the viewing system (low power microscope) may be cemented directly to roof prism 32 so that the lens and prism form a single unit which may be mounted for movement to and from the operative position shown behind lens 10.

Figure 9:
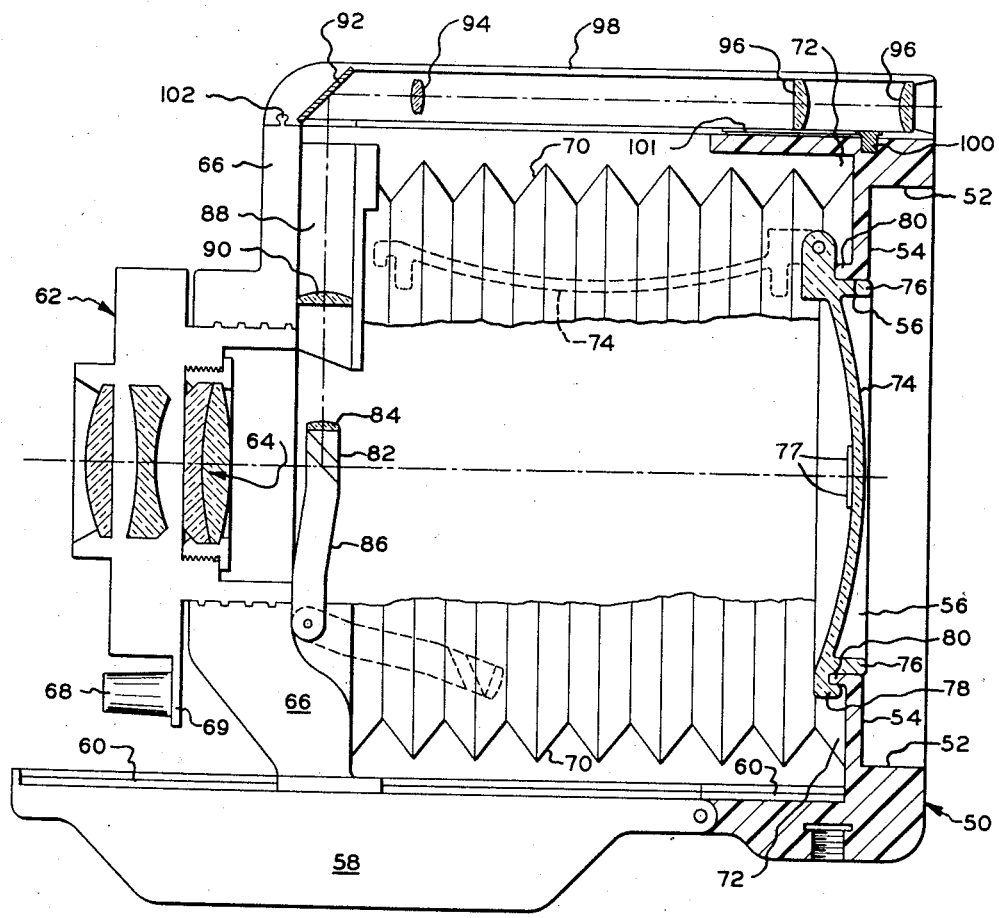
Fig. 9 is an exaggerated side elevational view, partially in section, illustrating apparatus in the form of a camera and including a combined range and view finder optical system constructed in accordance with the invention.

While mirror 14 has been described as a spherical echelon mirror mounting a pair of wedges as a light-deviating means, it may also comprise an ordinary spherical mirror 34, as shown in Figs. 4, 5 and 9 of the drawings, having a center of curvature located on the optical axis of the objective lens of the camera substantially midway between the mean position of the stop of said lens and the entrance pupil of the viewing system, this point being designated A in Figs. 4 and 5 of the drawings. A pair of wedges 36 and 38 may be mounted on the central portion of mirror 34 adjacent to one another above and below the optical axis of the objective lens with their line of intersection extending horizontally through the optical axis and with their bases located on opposite sides thereof. The forward surfaces of wedges 36 and 38 may be curved with their centers of curvature located at points B and C, respectively, in the plane of point A on a horizontal line through the optical axis of the objective. Alternatively, mirror 34 may be provided with deflecting means in the form of two adjacent spherical reflecting portions, located above and below the optical axis, having a horizontal line of intersection approximately through the optical axis and different centers of curvature located at B and C. The same alternative form of light-deviating means may be incorporated in the construction of an echelon mirror 40, shown in Fig. 6, wherein the major portion of the mirror has a center of curvature at A on the optical axis, while two relatively small adjacent portions located above and below the optical axis at the center of the mirror have centers of curvature at B and C, respectively.

In still another alternative embodiment, mirror 14 may be provided in two sections having two vertical lines of intersection extending to a third relatively short horizontal line of intersection located at the optical axis of the objective lens and providing the split field. The two sections of his type of mirror will have different centers of curvature located at points B and C and such a mirror may be an ordinary concave mirror or an echelon mirror.

The split ranging field is produced at the center of the viewing field by light from opposite lateral portions of the objective lens directed to the entrance pupil 27 of the viewing system by the concave mirror and light-deviating means or portions of said mirror. The ranging beams of light from the object being ranged are brought to a common focus so that the two portions of the image of the object appear to coincide at their line of intersection when the objective lens is in focus for the object ranged. The remainder of the viewing field surrounding the ranging field is produced by light from the objective lens reflected by the portions of the concave mirror surrounding the light-deviating means or portions thereof.

As previously intimated, the present range and view finder system is intended for use with a number of interchangeable lenses of different focal length. Accordingly, the center of curvature of the concave mirror should be at the mean position 11, at which focus is attained of all the lenses that are intended to be employed. This, of course, places limitations on the type and focal lengths of the lenses to be used since there is a limit to the allowable motion of the lens which will produce acceptable results and this is dependent on the focal lengths of the lenses and the image size or size of the exposure plane. For example, with a combined range and view finder system suitable for use with a camera having a five inch lens with a relative aperture of about f/4.5, the maximum permissible motion of the lens would be about two inches. With this type of system a five inch reverse telephoto lens (having at least one of its principal points behind the lens) could be used interchangeably with a ten inch telephoto lens (having its principal points in front of the lens).

The combined range finder and view finder system may be modified so that it can be used with a plurality of interchangeable lenses having a wider range of different focal lengths and stop positions by providing at least the light-deviating means or portions of the concave mirror with surfaces that are slightly diffusive so that, while rays from the marginal portions of the lens will not reach the entrance pupil of the viewing system by specular reflection, sufficient diffusely reflected light will be directed to the entrance pupil to produce a useful ranging field. For acceptable results, the forward surfaces of the wedges or deviating portions of the mirror should have diffusing lobes with a half intensity width which is less than the angular aperture of the objective lens. By half intensity width is meant the angular width of the diffusing lobe at the point where the intensity of light is half what it would be were the light reflected specularly. Since the viewing aperture of the objective lens is considerably larger than the ranging aperture and because the illumination of the viewing field is not as critical as the illumination of the ranging field, the remainder of the mirror which provides light for the viewing field can be provided with a diffusing surface having a diffusing lobe with a half intensity width which is three times the angular aperture of the lens. The diffusive surfaces are preferably such that at some nominal position of the lens stop, preferably the mean position, light from the ranging aperture of the lens is relayed to the entrance pupil by way of the center of the diffusing globe. In this embodiment, the use of an echelon mirror having a diffusive surface is preferable to a spherical mirror inasmuch as the entire echelon mirror, being flat, can be more readily located at the focal plane of the objective lens of the camera.

In another form of the combined range finder and view finder system of the invention shown in Fig. 7, reflecting means 20 comprises a plane mirror for reflecting light from mirror 14 toward reflecting element 30 and the latter comprises a penta prism for directing the light to eyepiece 28 and providing the necessary image reversals to produce an image which appears erect and with correct positions for left and right. The remainder of this system is the substantial equivalent of the system of Fig. 1, with the exception of a relay lens 26.

As previously noted, the spherical mirror 14 should be positioned with its reflecting surface as close as possible to the exposure plane of the camera since it is at this plane that the objective image is to be focused. Since photosensitive material is also positioned in the exposure plane, it may be necessary, when the mirror has a front reflecting surface, to displace the photosensitive material rearwardly because of the thickness of the mirror so that the reflecting surface thereof can be located at or closely adjacent the exposure plane. In the form of the invention shown in Fig. 8, a front surface mirror may be employed without displacing the photosensitive material by providing a weak positive lens 44 behind objective lens 10 for displacing the focal plane of the objective to a position forward of the exposure plane during ranging and viewing. Lens 44 is preferably associated with reflecting means 20 and is movable therewith from a position behind lens 10 in the path of light therefrom to the exposure plane, whereby the focal plane of lens 10 is returned to the exposure plane when it is desired to make an exposure.

Figure 10:
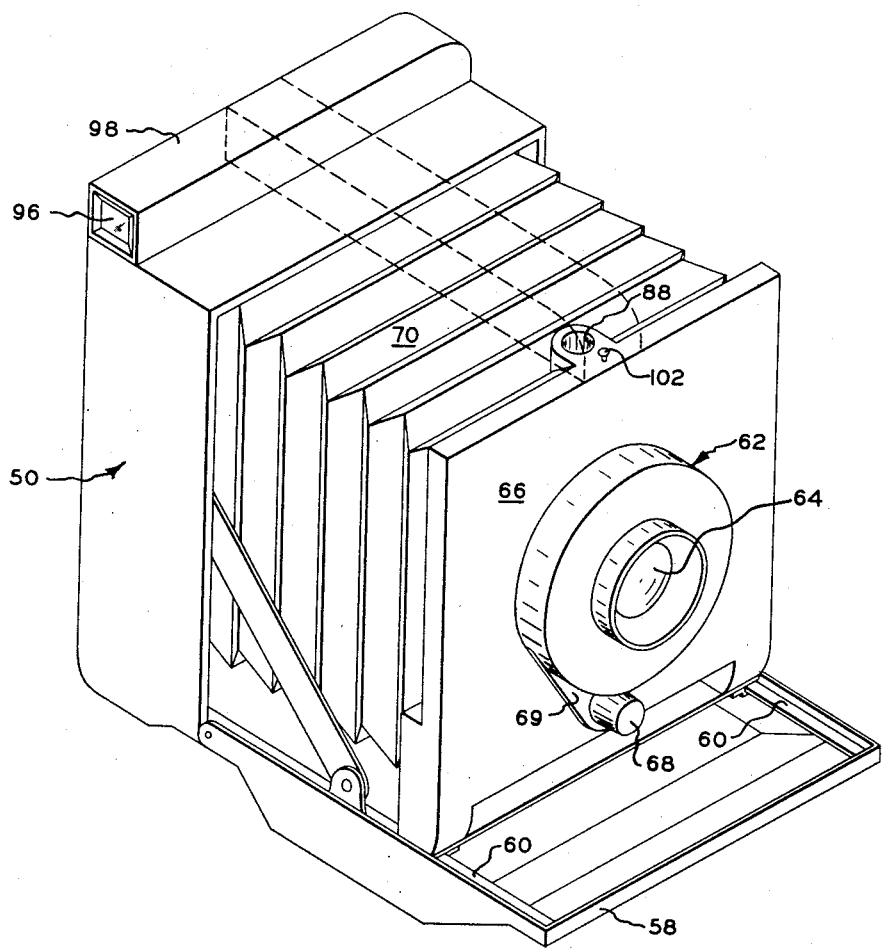
Fig. 10 is a perspective view of the camera of Fig. 9.

Reference is now made to Figs. 9 and 10 of the drawings wherein there is illustrated apparatus in the form of a camera embodying the present invention. The camera comprises a casing 50 having a reentrant section 52 at the rear and a rear wall 54 having a rear surface defining the exposure plane of the camera. Photosensitive material for use in the camera may be provided in the form of sheets or rolls and in a suitable device adapted to be secured to casing 50 within reentrant section 52. Devices of this type are conventional and well known in the art and may be adapted to the processing or development of the exposed photosensitive material. They preferably include a pressure plate or other means for retaining the photosensitive material against the rear surface of wall 54 in position for exposure. Wall 54 includes a rectangular exposure aperture 56 through which light from an objective lens is transmitted to the photosensitive material positioned for exposure across the aperture.

The camera includes a pivotable forward section or bed 58 mounting tracks 60 for a lens and shutter assembly, designated 62 and including a conventional photographic objective lens 64 mounted on a frame 66 slidably engaged in tracks 60. In one form of camera, for example, assembly 62 may include a cylindrical portion having helical threads or grooves engaged with frame 66 whereby the shutter is moved axially by rotation of the assembly. Means, including a manually engageable knob 68 attached to a lever 69 for pivoting assembly 62, are provided whereby the position of lens 64 relative to the exposure plane of the camera may be varied manually. Frame 66 mounting the lens and shutter assembly 62 is connected to casing 50 by a bellows 70 secured at one end to frame 66 and at its other end to the forward portion of wall 54. Bellows 70 provides an optical path between the lens and the exposure plane of the camera as well as an enclosure for elements of the combined range and view finder system. Casing 50 includes a forward reentrant section 72 adapted to receive frame 66, the latter being slidable rearwardly on tracks 60 into the reentrant section. Forward section 58 may be folded to extend across reentrant section 72 so that lens and shutter assembly 62 may be completely enclosed.

A spherical mirror 74 is provided, which corresponds, for example, to mirror 14 of Figs. 1 and 2 and which is pivotally mounted at its upper edge portion on rear wall 54 for movement from an operative position, wherein it extends across aperture 56, upwardly to an inoperative position out of the path of light from lens 64 to aperture 56. Mirror 74, in the form shown, comprises a rear surface reflecting mirror and includes rearwardly extending skirt 76 at its margins adapted to fit within aperture 56. Skirt 76 is provided for displacing the photosensitive material slightly to the rear so that the material is not contacted by the mirror and damaged thereby. Means such as wedges 77 are provided on the medial portion of the forward surface of mirror 74 for horizontally deviating, in opposite directions, light from the objects to be ranged, wedges 77 corresponding, for instance, to counterparts 16 and 18 as shown in Fig. 1.

In another form of the invention, mirror 74 may be provided with a forward reflecting surface which is located tangent to the exposure plane of the camera. In this form skirt 76 projects rearwardly of the exposure surface to a greater extent than shown for displacing the photosensitive material rearwardly to make room for the mirror when the latter is in operative position. Mirror 74 also includes outwardly extending flanges 78 adapted to engage a forwardly extending skirt 80 on rear wall 54 surrounding aperture 56 to provide a light-tight joint and for accurately positioning mirror 74 relative to lens 64.

The viewing system of the invention includes a roof prism 82 and an objective lens 84 cemented thereto and mounted behind the lens on the optical axis thereof and which, for example, comprise the counterpart of the second reflecting means 20 of Fig. 1. Prism 82 and lens 84 are mounted on an arm 86, in turn pivotally mounted at its lower end on frame 66 for movement from an operative position behind objective lens 64 on the optical axis thereof downward to an inoperative position out of the path of light from lens 64 to the exposure plane. An operating mechanism (not shown) is provided for imparting the pivotal movement to both mirror 74 and arm 86 and this mechanism is coupled with the shutter of assembly 62 whereby "cocking of the shutter" is effective to pivot mirror 74, prism 82 and lens 84 into their operative positions, open the shutter and the diaphragm aperture of lens 64 so that the combined range and view finding system may be employed. When it is desired to make an exposure, the shutter is tripped whereby the shutter is closed, the lens aperture is reduced to the desired diameter, mirror 74 and prism 82 and lens 84 are pivoted out of operative position to inoperative position, and the shutter is opened momentarily to make the desired exposure.

Since the means for mounting prism 82 and lens 84 must necessarily extend across a marginal portion of objective lens 64 and, consequently, will tend to block a portion of the field, it is preferred that such means be transparent and without lens power. In the form of the invention shown in Fig. 8, a weak positive lens used for moving the focal plane of the objective forward of the exposure plane could also serve as a means for mounting prism 82 and lens 84 without blocking any of the viewing field. In the embodiment wherein the first reflecting means is diffusive, the inclusion of an opaque mounting means for prism 82 would have very little effect insofar as blocking the field is concerned.

Frame 66 includes a portion providing a cylindrical passage 88 located immediately behind and adjacent lens 64 and having an axis in the plane of the optical axis of lens 64 disposed perpendicularly thereto. Passage 88 is open at both ends and a field lens 90 of a system for viewing mirror 74 is located within the passage. The other components of the viewing system, including a mirror 92, relay lens 94 and eyepiece 96, are mounted within a tubular housing 98 pivotally mounted on pin 100 on the upper portion of casing 50. Tubular member 98 has an operative position wherein it extends substantially parallel with the optical axis of lens 64 from the rear of casing 50 to a position in engagement with frame 66 so as to locate mirror 92 in position to receive light reflected from roof prism 82 through lens 84, passage 88 and lens 90. Mirror 92 redirects light from prism 82 through tube 98 and relay means 94 to eyepiece 96. Suitable engagement means, such as a button 102, may be provided on the upper portion of frame 66 for accurately locating tube 98 in operative position. Tube 98 is also mounted for sliding movement as well as pivotal movement by engaging pin 100 in a slot 101 in tube 98 so that the latter is movable to an inoperative position (shown in Fig. 10) on top of casing 50 wherein it extends substantially at a right angle to the optical axis of lens 64 and parallel with the rear of the camera casing when the camera is folded.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera including an objective lens, means defining an exposure plane at which photosensitive materials are positioned for exposure to light at the focal surface of said lens, means for displacing said objective relative to said exposure plane at least for focusing said lens, a combined range and view finder for viewing a field of view, including an object to be ranged, comprising, an optical system with an entrance pupil, for viewing the focal surface of said objective lens from the side of said focal surface on which light is incident, first reflecting means substantially at said exposure plane and at least coextensive with said exposure plane, said reflecting means comprising a spherically reflecting surface and at least two adjacent elements near the optic axis of said objective lens for reflecting and deviating light coming from different areas of said objective and forming portions of an object image substantially at said adjacent elements, said light being reflected and deviated in the direction of said objective for viewing through said viewing system, whereby the parts of the object image reflected by said adjacent elements appear in coincidence only when said objective is correctly focused on said object and is accordingly focused on the exposure plane of the camera, said first reflecting means being displaceable from said exposure plane in the path of light from said objective to said exposure plane, whereby photosensitive material located at said exposure plane may be exposed, second reflecting means substantially on the optic axis of said objective between the latter and said exposure plane located at substantially the maximum distance from said exposure plane permitted by spatial limitations for redirecting the optic axis of said viewing system, at least said second reflecting means being displaceable from said optic axis in the path of light from said lens to said exposure plane, said viewing system including an eyepiece located out of the path of light between said objective and said exposure plane, and at least a third reflecting means for reversing the image of said first reflecting means directed to said eyepiece whereby said image appears erect and with correct relative positions for right and left.

2. A combined range and view finder as defined in claim 1 wherein at least said adjacent elements of said first reflecting means have diffusive surfaces having diffusing lobes with a half intensity width which is less than the angular aperture of said objective lens.

3. A combined range and view finder as defined in claim 1 wherein said first reflecting means includes reflecting portions surrounding said adjacent elements, the last-mentioned reflecting elements having diffusive surfaces with diffusing lobes having a half intensity width which is less than the angular aperture of said objective lens.

4. A combined range and view finder as defined in claim 1 wherein said first reflecting means comprises a concave mirror and said two adjacent elements are capable of deviating portions of light reflected from said means in opposite directions at angles less than that subtended by the radius of said objective at said exposure plane.

5. A combined range and view finder as defined in claim 4 wherein said first reflecting means comprises a concave echelon mirror and said two adjacent elements near the optical axis of said mirror have centers of curvature differing from each other and from said mirror.

6. A combined range and view finder as defined in claim 5 wherein at least said adjacent elements of said first reflecting means have light-diffusing surfaces with a diffusing lobe having a half intensity width less than the angular aperture of said objective lens.

7. A combined range and view finder as defined in claim 1 wherein said first reflecting means comprises a concave echelon mirror having a center of curvature located on the optical axis of said objective lens substantially midway between the mean focused position of said lens and said entrance pupil of said viewing system, and said two adjacent elements have centers of curvature located substantially at the same distance from the focal plane and located on opposite sides of said optical axis.

8. A combined range and view finder as defined in claim 7 wherein said adjacent elements are located on opposite sides of said optical axis and join at a line through said optical axis and the centers of curvature of said portions are located along a line through said optical axis perpendicular to the first-mentioned line.

9. A combined range and view finder as defined in claim 1 wherein said first reflecting means comprises a concave mirror having a center of curvature on the optical axis of said objective lens and substantially midway between the mean focused position of said lens and said entrance pupil of said viewing system, and said adjacent elements comprise a pair of optical wedges substantially at the center of said first reflecting means on opposite sides of said optical axis with their bases on opposite sides of said optical axis.

10. A combined range and view finder as defined in claim 9 wherein each of said wedges includes a diffusive surface having a diffusing lobe with a half intensity width which is less than the angular aperture of said objective lens.

11. A combined range and view finder as defined in claim 10 wherein said echelon mirror includes a diffusive surface having a half intensity width which is less than three times the angular aperture of said objective lens.

12. A combined range and view finder as defined in claim 1 wherein said optical system includes a roof prism disposed in the path of and for reflecting said reflected and deviated light.

13. A combined range and view finder as defined in claim 1 wherein said second reflecting means includes a roof prism disposed in and displaceable from the path of light between said lens and said exposure plane.

14. A combined range and view finder as defined in claim 1 including a weak positive lens located on the optical axis of said objective lens immediately behind the latter in association with said second reflecting means for shifting the focal surface of said objective lens forward of said focal plane to the plane of said first reflecting means positioned closely adjacent said exposure plane between the latter and said objective lens, said positive lens being displaceable with said second reflecting means out of the path of light between said objective lens and said exposure plane.

15. A combined range and view finder as defined in claim 1 wherein said eyepiece is mounted on said camera with its optical axis substantially parallel with the axis of said objective lens.

16. A combined range and view finder as defined in claim 1 wherein means are provided for mounting said eyepiece and at least another optical element of said viewing system as a unit on said camera with the optical axis of said eyepiece parallel with the optical axis of said objective lens, the last-mentioned means being so constructed as to permit the movement of said eyepiece and said other element as a unit relative to said camera whereby the overall size of said camera and viewing system may be reduced when not in use.

17. A combined range and view finder as defined in claim 16 wherein said means for mounting said eyepiece and at least another optical element of said viewing system is pivotable as a unit from an operative position wherein the optical axis of said eyepiece is parallel with the optical axis of said objective lens to an inoperative position wherein said optical axis of said eyepiece is perpendicular to the optical axis of said objective lens.

References Cited in the file of this patent

UNITED STATES PATENTS

| 741,102 | Borsum | Oct. 13, 1903 |
| 1,307,512 | Neill | June 25, 1915 |
| 2,089,703 | May | Aug. 10, 1937 |

FOREIGN PATENTS

| 15,199 | Great Britain | July 2, 1907 |
| 559,140 | Great Britain | Feb. 4, 1944 |
| 933,132 | Germany | Sept. 15, 1955 |
| 314,355 | Switzerland | July 31, 1956 |